United States Patent [19]

Hollstein et al.

[11] Patent Number: 5,354,939
[45] Date of Patent: Oct. 11, 1994

[54] STABILIZED EPOXY RESIN COMPOSITIONS

[75] Inventors: Werner Hollstein, Freiburg, Fed. Rep. of Germany; Peter Rüger, Oberwil, Switzerland; Claus W. Rabener, Oetlingen, Fed. Rep. of Germany

[73] Assignee: Ciba-Geigy Corporation, Ardsley, N.Y.

[21] Appl. No.: 169,954

[22] Filed: Dec. 20, 1993

Related U.S. Application Data

[63] Continuation of Ser. No. 966,767, Oct. 26, 1992, abandoned.

[30] Foreign Application Priority Data

Oct. 29, 1991 [CH] Switzerland ............ 03158/91-9

[51] Int. Cl.$^5$ .............. C08K 9/04; C08L 63/00; C08L 63/02
[52] U.S. Cl. .................... 523/206; 523/209; 523/427; 523/457; 523/466
[58] Field of Search ............ 523/206, 209, 427, 457, 523/466

[56] References Cited

U.S. PATENT DOCUMENTS

| | | | |
|---|---|---|---|
| 3,396,140 | 6/1968 | Weller | 523/466 |
| 3,449,274 | 6/1969 | Salensky | 523/427 |
| 4,518,631 | 5/1985 | Antonen | 427/96 |
| 4,569,956 | 2/1986 | Bretigam | 523/466 |
| 4,847,122 | 7/1989 | Goldberg | 523/466 |
| 5,053,476 | 10/1991 | Akutagawa | 525/407 |

FOREIGN PATENT DOCUMENTS

| | | |
|---|---|---|
| 0348193 | 12/1989 | European Pat. Off. . |
| 0348193 | 12/1989 | European Pat. Off. . |
| 0459614 | 12/1991 | European Pat. Off. . |
| 1442669 | 5/1966 | France . |
| 2182833 | 12/1973 | France . |
| 1415173 | 11/1975 | United Kingdom . |

OTHER PUBLICATIONS

Chemical Abstract, vol. 66, 29761x (1967).
J. Am. Oil Chem. Soc., vol. 61, 382–387 (1984).

*Primary Examiner*—Ralph H. Dean
*Assistant Examiner*—Donald R. Wilson
*Attorney, Agent, or Firm*—William A. Teoli, Jr.

[57] ABSTRACT

Compositions comprising (a) a liquid epoxy resin, (b) a filler containing at least 50% by weight of quartz flour, (c) a polyether polyol, and (d) an organically modified sheet silicate, show a constant viscosity under thermal and mechanical stress and are suitable for applications in vacuum casting technology, especially as encapsulating material for electrical and electronic components.

9 Claims, No Drawings

STABILIZED EPOXY RESIN COMPOSITIONS

This application is a continuation, of application Ser. No. 07/966,767, filed Oct. 26, 1992, now abandoned.

The present invention relates to stabilised epoxy resin compositions which can be used as casting materials, especially as encapsulating systems for high-voltage components.

When using quartz flour-filled epoxy resins as casting materials for high-tension components like fly-back transformers for television sets or motor car ignition coils, vacuum processing is the standard method for ensuring the quality of the finished components. In this method the resin composition is prepared in a thin-film degassing mixer to ensure a void-free moulding. The thermal and mechanical stresses to which the resin is subjected during preparation may result in the epoxy groups reacting with one another and hence in a sharp increase in viscosity. This undesirable effect can pose severe problems for the processer, typically changed reactivity and flow properties and, as a consequence, also a diminished quality of the finished components. Furthermore, cleansing of the equipment is complicated and continuous processing is made impossible.

EP-A 348 193 discloses an epoxy resin composition comprising a liquid epoxy resin, an inorganic filler, a polyether polyol and a hardener consisting of an acid anhydride and an imidazole. This composition has superior corrosion resistance and is suitable for use as a casting resin for encapsulating ignition coils for automobiles.

It has now been found that such a resin composition can be stabilised by the addition of an organically modified sheet silicate based on smectite, thereby preventing an increase in viscosity during preparation in the thin-film degassing mixer. This effect is surprising, as said sheet silicates are normally used as thixotropic agents and this utility would lead one to expect an increase in viscosity on account of the low shear rate in the thin-film degassing mixture.

Specifically, the invention provides a composition comprising
(a) a liquid epoxy resin,
(b) a filler containing at least 50% by weight of quartz flour,
(c) a polyether polyol, and
(d) an organically modified sheet silicate.

The epoxy resin (a) of this invention may quite generally be any compound conventionally used in the epoxy resin art, provided it is liquid in the temperature range of up to 50° C.

Illustrative examples of epoxy resins are:

I) Polyglycidyl and poly($\beta$-methylglycidyl) esters which are obtainable by reacting a compound containing at least two carboxyl groups in the molecule and epichlorohydrin or $\beta$-methyl epichlorohydrin. The reaction is conveniently carried out in the presence of a base.

Compounds containing at least two carboxyl groups in the molecule may suitably be aliphatic polycarboxylic acids. Exemplary of these polycarboxylic acids are oxalic acid, succinic acid, glutaric acid, adipic acid, pimelic acid, suberic acid, azelaic acid, sebacic acid or dimerised or trimerised linoleic acid.

Cycloaliphatic polycaxboxylic acids may also be used, for example tetrahydrophthalic acid, 4-methyltetrahydrophthalic acid, hexahydrophthalic acid or 4-methylhexahydrophthalic acid.

Aromatic polycarboxylic acids may also be used, for example phthalic acid, isophthalic acid or terephthalic acid.

II) Polyglycidyl or poly($\beta$-methylglycidyl) ethers which are obtainable by reacting a compound containing at least two free alcoholic hydroxyl groups and/or phenolic hydroxyl groups in the molecule with epichlorohydrin or $\beta$-methylepichlorohydrin, under alkaline conditions or in the presence of an acid catalyst and subsequent treatment with an alkali.

Ethers of this type are derived, for example, from acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, bis(trimethylol)propane, pentaerythritol, sorbitol, as well as from polyepichlorohydrins.

They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei, such as N,N-bis(2-hydroxyethyl)aniline or p,p'-bis(2-hydroxyethylamino)diphenyhnethane.

The epoxy compounds may also be derived from mononuclear phenols such as resorcinol or hydroquinone, or they are based on polynuclear phenols such as bis(4-hydroxyphenyl)methane, 2,2-bis(4-hydroxyphenyl)propane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols, as described above.

III) Poly(N-glycidyl) compounds which are obtainable, for example, by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylarninophenyl)methane.

The poly(N-glycidyl) compounds also include triglycidyl isocyanurate, N,N'-diglycidyl derivatives of cycloalkylene ureas such as ethyleneurea or 1,3-propyleneurea and di-glycidyl derivatives of hydantoins, such as 5,5-dimethylhydantoin.

IV) Poly(S-glycidyl) compounds are typically bis-S-glycidyl derivatives which are derived from dithiols such as 1,2-ethanedithiol or bis(4-mercaptomethylphenyl) a ether.

V) Cycloaliphatic epoxy resins such as bis(2,3-epoxycyclopentyl) ether, 2,3-epoxycyclopentylglycidyl ether, 1,2-bis(2,3-epoxycyclopentyloxy) ethane or 3,4-epoxycyclohexylmethyl -3',4'-epoxycyclohexanecarboxylate.

It is also possible, however, to use epoxy resins in which the 1,2-epoxy groups are attached to different hetero atoms or functional groups. These compounds comprise, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins having an epoxy value of 1 to 10 equivalents/kg which are glycidyl ethers, glycidyl esters or N-glycidyl derivatives of aromatic, heterocyclic, cycloaliphatic or aliphatic compounds.

If desired, it is of course also possible to use a mixture of two or more epoxy resins.

Component (a) of the novel compositions is preferably a diglycidyl ether of a bisphenol, a cycloaliphatic epoxide, or a mixture of a diglycidyl ether of a bisphenol and a cycloaliphatic epoxide.

More particularly, component (a) is a mixture of a diglycidyl ether of bisphenol A and a cycloaliphatic epoxide.

A mixture of a diglycidyl ether of bisphenol A and 3,4-epoxycyclohexyl-methyl-3,4-epoxycyclohexanccarboxylate is especially preferred.

The epoxy resin (a) is normally used in an amount of 10–65% by weight, preferably of 20–50% by weight, based on the entire composition.

If the epoxy resin (a) is a mixture of a diglycidyl ether of a bisphenol and a cycloaliphatic epoxide, then said mixture will usually contain 50–90% by weight, preferably 55–70% by weight, of diglycidyl ether of a bisphenol and 10–50% by weight, preferably 30–45% by weight, of a cycloaliphatic epoxide.

Fillers which may be suitably used as component (b) of the novel compositions are, besides the quartz flour already mentioned, typically aluminium hydroxide, alumina, titanium dioxide, calcium carbonate, talcum, clay, calcium silicate, mica, glass fibres, glass powder, chalk or dolomite.

The filler (b) is preferably a mixture of 50–100% by weight of quartz flour and 0–50% by weight of chalk or dolomite.

It is particularly preferred to use pure quartz flour as filler (b).

The novel compositions preferably contain 35–90% by weight, most preferably 50–75% by weight, of filler (b), based on the entire composition.

Quite generally any polyoxyalkylene polyol may be used as component (c) of the novel compositions.

Preferred polyether polyols are polyethylene glycol, 2-ethylglycerol polyethylene glycol, 2-ethylglycerol polypropylene glycol and, most preferably, glycerol polypropylene glycol.

The novel compositions normally contain up to 10% by weight, preferably 1 to 5% by weight, of the polyether polyol (c), based on the entire composition.

Quite generally an organically modified sheet silicates familiar to those skilled in the art as rheological additives may be used as component (d), typically minerals which contain sodium, calcium, magnesium, iron, lithium or aluminium silicates. It is preferred to use the organic quaternary ammonium salt modified sheet silicates based on bentonite described, inter alia, in J. Am. Oil Chem. Soc. 61, 382–387 (1984).

The modified bentonites sold by NL Chemicals under the registered trademark BENTONE ® are particularly suitable. BENTONE ® SD-2 (NL Chemicals) is especially preferred.

The novel compositions conveniently contain 0.05–2% by weight, preferably 0.1–1% by weight, of component (d), based on the entire composition.

The novel compositions may contain, as further customary modifiers, pigments and dyes such as carbon black, oxide pigments and titanium dioxide, flame retardants, thixotropic agents, flow control agents, typically silicones, waxes and stearates, some of which may also be used as mould release agents, antioxidants and light stabilisers.

The novel compositions are suitable for making cured products, typically for encapsulating electrical or electronic components. The invention therefore further relates to compositions comprising the above described components (a)–(d) and additionally a hardener (e) for the epoxy resin (A).

The hardener (e) may be any suitable epoxy resin hardener, typically selected from the group consisting of cyanamide, dicyandiamide, polycarboxylic acids, anhydrides of polycarboxylic acids, polyamines, polyamino-amides, polyadducts of amines and polyepoxides and polyols.

Preferred hardeners are anhydrides of polycarboxylic acids, typically phthalic anhydride, nadic anhydride, methylnadic anhydride, methyltetrahydrophthalic anhydride, methylhexahydrophthalic anhydride and, preferably, tetrahydrophthalic anhydride and hexahydrophthalic anhydride.

The novel compositions may contain a curing accelerator (f) as further additional component. Suitable accelerators are known to those skilled in the art. Typical examples are: complexes of amines, preferably tertiary amines, with boron trifluoride or boron trichloride; tertiary amines such as benzyl dimethylamine; urea derivatives such as N-4-chlorophenyl-N'N'-dimethylurea (Monuron); unsubstituted or substituted imidazoles such as imidazole or 2-phenylimidazole.

Preferred accelerators (f) are imidazoles, most preferably 2-phenylimidazole and 2-ethyl-4-methylimidazole.

Components (e) and (f) are added in the customary effective amounts, i.e. sufficient for curing the novel compositions. The ratio of components (a) and (e) and optional component (f) will depend on the type of compounds used, on the requisite curing rate and on the properties desired in the final product, and can be readily determined by the skilled person. If component (e) is an anhydride of a polycarboxylic acid, it is common to use to 0.4 to 1.1 equivalents of anhydride groups per epoxy equivalent.

The resin composition (a)–(d) and the hardener component (e) (if desired, together with optional component (f)) are usually stored separately and are not mixed until shortly before application.

The cure of the novel compositions can be effected in a manner known per se in one or two steps, and usually by heating to temperatures in the range from 80° to 200° C., preferably from 100° to 180° C.

The compositions can be prepared in conventional manner by mixing the components by means of known mixing aggregates (stirrers, roll mills).

Owing to their superior stability to thermal and mechanical stresses, the novel compositions are especially suitable for utilities in vacuum resin casting technology, preferably as encapsulating material for electrical and electronic components. The cured casting materials have good mechanical and dielectical properties and have a long life.

The invention therefore also relates to the use of the novel compositions as encapsulating material for electrical and electronic components.

The invention is illustrated in more detail by the following Example.

EXAMPLE 1:

To investigate the viscosity behaviour, resin composition I and comparison composition II (same composition but without component (d)) are degasseal over a period of 5 days in a thin-film degassing mixer at a temperature of 80° C. and a pressure of 200 Pa, the viscosity and epoxy value of the resin mixture being determined at daily intervals. The results are summarised in Table 1.

Composition I:
(a) Epoxy resin composition comprising 20 parts by weight of a diglycidyl ether of bisphenol A having an epoxy value of 5.2–5.4 eq/kg and 12 parts by weight of 3,4-epoxycyclohexylmethyl-3,4-epoxycyclohexancarboxylate having an epoxy value of 7.0–7.5 eq/kg;
(b) 65 parts by weight of quartz flour;,
(c) 3 parts by weight of glycerol polypropylene glycol;
(d) 0.2 pans by weight of BENTONE® SD-2 (NL Chemicals).

Composition II:
(a) Epoxy resin composition comprising 20 parts by weight of a diglycidyl ether of bisphenol A having an epoxy value of 5.2–5.4 eq/kg and 12 pans by weight of 3,4-epoxycyclohexylmethyl-3,4-epoxycyclohexancarboxylate having an epoxy value of 7.0–7.5 eq/kg;
(b) 65 parts by weight of quartz flour,
(c) 3 parts by weight of glycerol polypropylene glycol.

TABLE 1

| | Composition I | | Composition II | |
|---|---|---|---|---|
| Days | Epoxy value [eq/kg] | Viscosity [Pa · s] | Epoxy value [eq/kg] | Viscosity [Pa · s] |
| 1 | 1.88 | 230 | 1.88 | 290 |
| 2 | 1.88 | 230 | 1.81 | 450 |
| 3 | 1.88 | 240 | 1.75 | 950 |
| 4 | 1.88 | 240 | 1.66 | >1000 |
| 5 | 1.88 | 240 | 1.49 | >1000 |

What is claimed is:

1. A composition comprising
   (a) a liquid epoxy resin,
   (b) a filler containing at least 50% by weight of quartz flour,
   (c) a polyether polyol, and
   (d) 0.05–2% by weight, based on the entire composition, of an organically modified sheet silicate prepared by reacting bentonite with an organic quaternary ammonium salt.

2. A composition according to claim 1, wherein component (a) is a diglycidyl ether of a bisphenol, a cycloaliphatic epoxide, or a mixture of a diglycidyl ether of a bisphenol and a cycloaliphatic epoxide.

3. A composition according to claim 1, wherein component (a) is a mixture of a diglycidyl ether of bisphenol A and a cycloaliphatic epoxide.

4. A composition according to claim 1, wherein component (a) is a mixture of a diglycidyl ether of bisphenol A and 3,4-epoxycyclohexylmethyl-3,4-epoxycyclohexanecarboxylate.

5. A composition according to claim 1, wherein component (b) is a mixture of 50–100% by weight of quartz flour and 0–50% by weight of chalk or dolomite.

6. A composition according to claim 1, wherein the filler (b) is 100% by weight quartz flour.

7. A composition according to claim 1, wherein component (c) is selected from the group consisting of glycerol polypropylene glycol, polyethylene glycol, 2-ethylglycerol polyethylene glycol and 2-ethylglycerol polypropylene glycol.

8. A composition according to claim 1, wherein component (c) is glycerol polypropylene glycol.

9. A composition according to claim 1 which additionally comprises a hardener (e) for the epoxy resin (a).

* * * * *